(12) United States Patent
Nemoto

(10) Patent No.: US 6,641,120 B2
(45) Date of Patent: Nov. 4, 2003

(54) METHOD FOR CONTROLLING DRIVE OF ACTUATOR OF ACTIVE VIBRATION ISOLATION SUPPORT SYSTEM

(75) Inventor: Hirotomi Nemoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/200,084

(22) Filed: Jul. 19, 2002

(65) Prior Publication Data

US 2003/0030203 A1 Feb. 13, 2003

(30) Foreign Application Priority Data

Jul. 31, 2001 (JP) ........................................ 2001-232063

(51) Int. Cl.⁷ .......................... F16F 13/00; F16F 15/00; F16F 5/00; F16M 11/00; F16M 5/00
(52) U.S. Cl. ............................ 267/140.14; 267/140.15
(58) Field of Search ...................... 267/140.11, 140.13, 267/140.14, 140.15

(56) References Cited

U.S. PATENT DOCUMENTS

| | | | | |
|---|---|---|---|---|
| 4,650,170 A | * | 3/1987 | Fukushima | 267/140.14 |
| 5,439,204 A | * | 8/1995 | Yamazoe et al. | 267/140.14 |
| 5,779,231 A | * | 7/1998 | Okazaki et al. | 267/140.14 |
| 5,939,625 A | * | 8/1999 | Torii et al. | 73/118.1 |
| 5,947,456 A | * | 9/1999 | Aoki | 267/140.14 |
| 6,062,550 A | * | 5/2000 | Aoki | 267/140.13 |
| 6,186,485 B1 | * | 2/2001 | Kawazoe | 267/140.14 |
| 6,364,294 B1 | * | 4/2002 | Gennesseaux et al. | 267/140.13 |
| 6,422,546 B1 | * | 7/2002 | Nemoto et al. | 267/140.14 |
| 6,464,213 B1 | * | 10/2002 | Kojima | 267/140.14 |
| 6,527,262 B2 | * | 3/2003 | Hagino et al. | 267/140.14 |

FOREIGN PATENT DOCUMENTS

JP         07-042783         2/1995

* cited by examiner

Primary Examiner—Jack Lavinder
Assistant Examiner—Devon Kramer
(74) Attorney, Agent, or Firm—Carrier, Blackman & Associates, P.C.; Joseph P. Carrier; William D. Blackman

(57) ABSTRACT

A method for controlling the drive of an actuator of an active vibration isolation support system based on crank pulses detected by a crank pulse sensor, involves determination of a crank angular speed, a crank angular acceleration, an engine torque and an amplitude of the engine vibration from the detected crank pulses. When the amplitude is less than a predetermined value the actuator of the active vibration isolation support system is controlled based on the calculated amplitude and a preset phase. On the other hand, when the amplitude is equal to or greater than the predetermined value, an engine vibration phase is calculated from the phase at which the torque is a maximum, and the actuator of the active vibration isolation support system is controlled based on the calculated amplitude and the calculated phase. Thus controlled, the system exhibits an effective vibration isolation function in accordance with the vibration characteristics of individual engines.

10 Claims, 5 Drawing Sheets

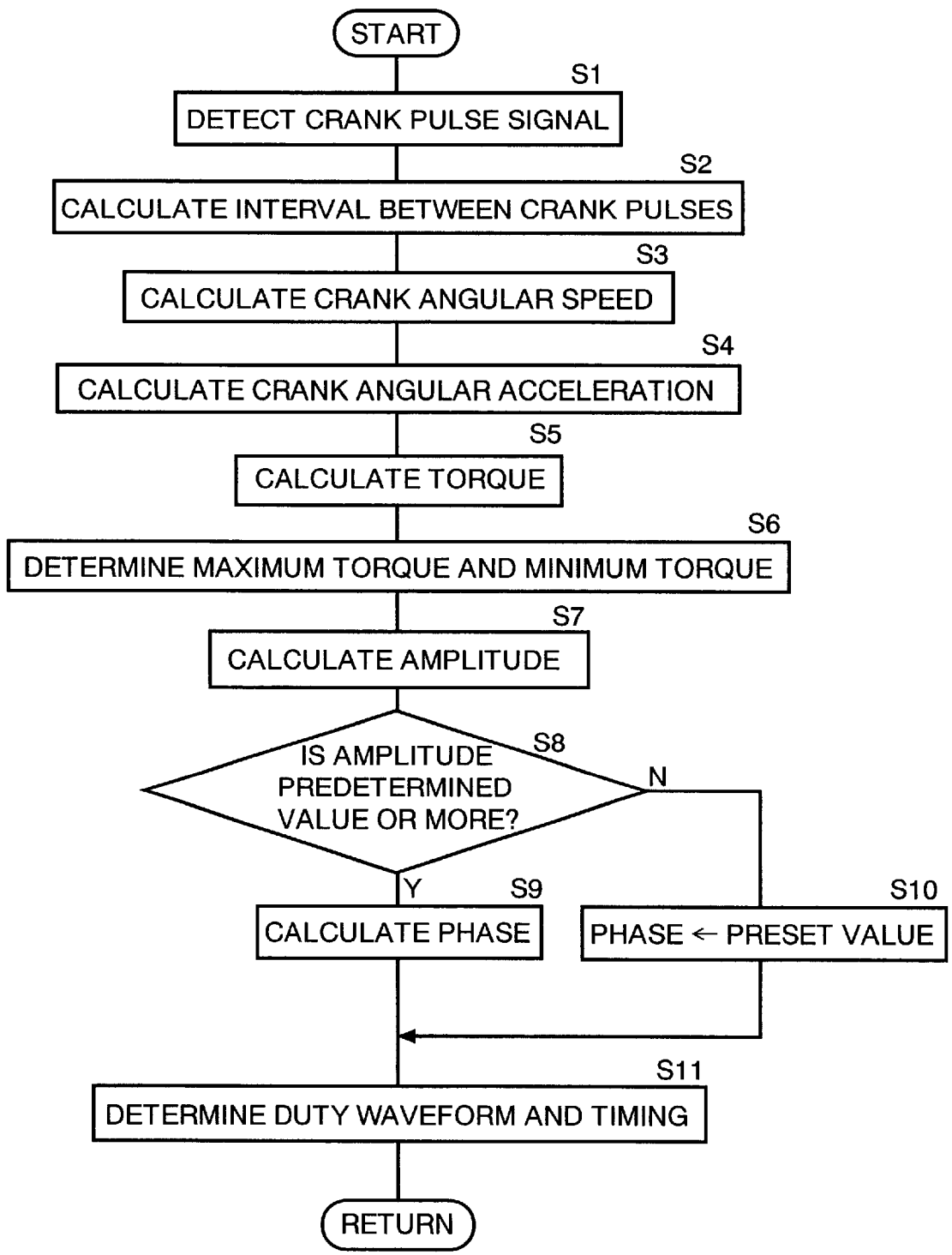

METHOD FOR CONTROLLING DRIVE OF ACTUATOR OF ACTIVE VIBRATION ISOLATION SUPPORT SYSTEM

BACKGROUND OF THE INVENTION

1. Technical Field of the Invention

The present invention relates to a method for controlling the drive of an actuator of an active vibration isolation support system comprising an elastic body receiving vibration from an engine, a liquid chamber having a wall of which at least a part is formed from the elastic body, a movable member for changing the capacity of the liquid chamber, and an actuator for driving the movable member by means of an electromagnetic force.

2. Discussion of Relevant Art

Such an active vibration isolation support system is known from Japanese Patent Application Laid-open No. 7-42783.

This active vibration isolation support system changes a spring constant by applying alternating current to an actuator so as to vibrate a movable member. The relationship between the phase and peak current value of the alternating current that sets the spring constant is stored as a map, and the phase and peak current value of the alternating current to be applied to the actuator are obtained from the map according to the rotational speed of the engine, thereby allowing the active vibration isolation support system to exhibit an effective vibration isolation function in various regions of the rotational speed of the engine.

However, this conventional system cannot always exhibit an effective vibration isolation function since there are variations among individual engines in the vibration magnitude and the vibration phase, and the influence of changes in the vibration characteristics accompanying long-term use of the engine cannot be taken into consideration.

SUMMARY OF THE INVENTION

The present invention has been achieved under the above-mentioned circumstances, and it is an object of the present invention to allow an active vibration isolation support system to exhibit an effective vibration isolation function in accordance with the vibration characteristics of individual engines.

In order to achieve the above-mentioned object, in accordance with a first aspect of the present invention, there is proposed a method for controlling the drive of an actuator of an active vibration isolation support system comprising an elastic body receiving vibration from an engine, a liquid chamber having a wall of which at least a part is formed from the elastic body, a movable member for changing the capacity of the liquid chamber, and an actuator for driving the movable member by means of an electromagnetic force, the method comprising the steps of estimating an engine vibration magnitude and an engine vibration phase by detecting crank pulses of the engine, and controlling the actuator based on the estimated engine vibration phase when the estimated engine vibration magnitude is equal to or greater than a predetermined value, and controlling the actuator based on a preset engine vibration phase when the estimated engine vibration magnitude is less than the predetermined value.

In accordance with this arrangement, the engine vibration magnitude and the engine vibration phase are estimated from crank pulses of the engine, and the actuator is controlled based on the estimated engine vibration phase when the estimated engine vibration is large. Therefore, an effective vibration isolation function can be exhibited by appropriately controlling the actuator without it being influenced by variations in the magnitude and phase of the vibration among individual engines or changes in the vibration characteristics accompanying long-term use of the engine. Furthermore, the actuator is controlled based on the preset engine vibration phase when the estimated engine vibration is small, even when it is difficult to estimate the engine vibration phase because the engine vibration is small. Therefore, an effective vibration isolation function can be exhibited by appropriately controlling the actuator.

Moreover, in accordance with a second aspect of the present invention, there is proposed a method for controlling the drive of an actuator of an active vibration isolation support system comprising an elastic body receiving vibration from an engine, a liquid chamber having a wall of which at least a part is formed from the elastic body, a movable member for changing the capacity of the liquid chamber, and an actuator for driving the movable member by means of an electromagnetic force, the method comprising estimating an engine vibration magnitude and an engine vibration phase by detecting crank pulses of the engine, and controlling the actuator based on the estimated engine vibration magnitude and the estimated engine vibration phase when the estimated engine vibration magnitude is equal to or greater than a predetermined value, and controlling the actuator based on the estimated engine vibration magnitude and a preset engine vibration phase when the estimated engine vibration magnitude is less than the predetermined value.

In accordance with this arrangement, the engine vibration magnitude and the engine vibration phase are estimated from crank pulses of the engine, and the actuator is controlled based on the estimated engine vibration magnitude and the estimated engine vibration phase when the estimated engine vibration is large. Therefore, an effective vibration isolation function can be exhibited by appropriately controlling the actuator without it being influenced by variations in the magnitude and phase of the vibration among individual engines or changes in the vibration characteristics accompanying long-term use of the engine. Furthermore, the actuator is controlled based on the estimated engine vibration magnitude and the preset engine vibration phase when the estimated engine vibration is small. Therefore, even when it is difficult to estimate the engine vibration phase because the engine vibration is small, an effective vibration isolation function can be exhibited by appropriately controlling the actuator.

The elastic body of the present invention corresponds to a first elastic body 14 of an embodiment, the liquid chamber of the present invention corresponds to a first liquid chamber 24 of the embodiment, and the engine vibration magnitude of the present invention corresponds to an amplitude at the position of an active vibration isolation support system M of the embodiment.

Modes for carrying out the present invention are explained below by reference to an embodiment of the present invention illustrated in the attached drawings.

BRIEF DESCRIPTION OF DRAWINGS

FIGS. 1 to 5 illustrate one embodiment of the present invention.

FIG. 1 is a longitudinal cross section of an active vibration isolation support system.

FIG. 2 is a cross section along line 2—2 in FIG. 1.

FIG. 3 is a cross section along line 3—3 in FIG. 1.

FIG. 4 is an enlarged view of an essential part of FIG. 1.

FIG. 5 is a flow chart showing a method for controlling an actuator.

DETAILED DESCRIPTION OF EMBODIMENT OF INVENTION

Figure 1:
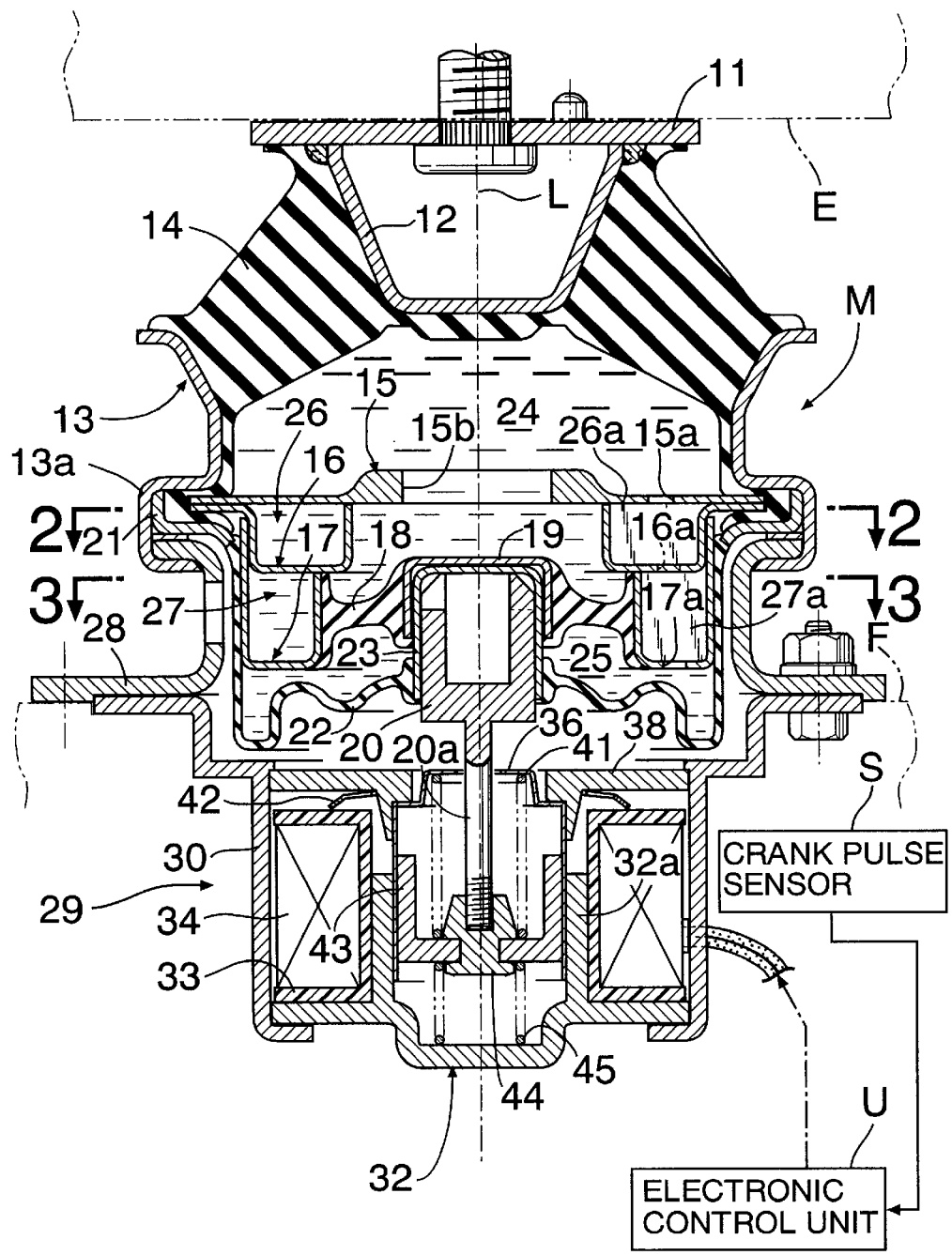

An active vibration isolation support system M shown in FIGS. 1 to 4 is for elastically supporting an engine E of an automobile in a vehicle body frame F. The system M is controlled by an electronic control unit U to which is connected a crank pulse sensor S for detecting crank pulses that are output accompanying rotation of a crankshaft of the engine E. These crank pulses are output 36 times per rotation of the crankshaft, that is, once for every 10° of crank angle.

The active vibration isolation support system M has a structure that is substantially symmetrical with respect to an axis L. The system M includes an inner tube 12 that is welded to a plate-shaped mounting bracket 11 that is joined to the engine E and an outer tube 13 that is placed coaxially around the inner tube 12. The inner tube 12 and the outer tube 13 are bonded by vulcanization bonding to the upper end and lower end respectively of a first elastic body 14 made of a thick rubber. A disc-shaped first orifice-forming member 15 having an aperture 15b in its center, an annular second orifice-forming member 16 having a dipper-shaped section open at the top, and a third orifice-forming member 17 similarly having a U-shaped section open at the top are welded into a single unit. The outer peripheries of the first orifice-forming member 15 and the second orifice-forming member 16 are superimposed and fixed to a caulking fixing part 13a provided in a lower part of the outer tube 13.

The outer periphery of a second elastic body 18 made of a rubber membrane is fixed by vulcanization bonding to the inner periphery of the third orifice-forming member 17. A cap 19 that is fixed by vulcanization bonding to the inner periphery of the second elastic body 18 is press-fitted and fixed onto a movable member 20 that is disposed on the axis L in a vertically movable manner. A ring 21 is fixed to the caulking fixing part 13a of the outer tube 13, the outer periphery of a diaphragm 22 is fixed to the ring 21 by vulcanization bonding. A cap 23 that is fixed by vulcanization bonding to the inner periphery of the diaphragm 22 is press-fitted and fixed onto the movable member 20.

A first liquid chamber 24, which is filled with a liquid, is thus defined between the first elastic body 14 and the second elastic body 18, and a second liquid chamber 25, which is filled with a liquid, is thus defined between the second elastic body 18 and the diaphragm 22. The first liquid chamber 24 and the second liquid chamber 25 communicate with each other via an upper orifice 26 and a lower orifice 27 that are formed by the first to third orifice-forming members 15,16 and 17.

Figure 2:
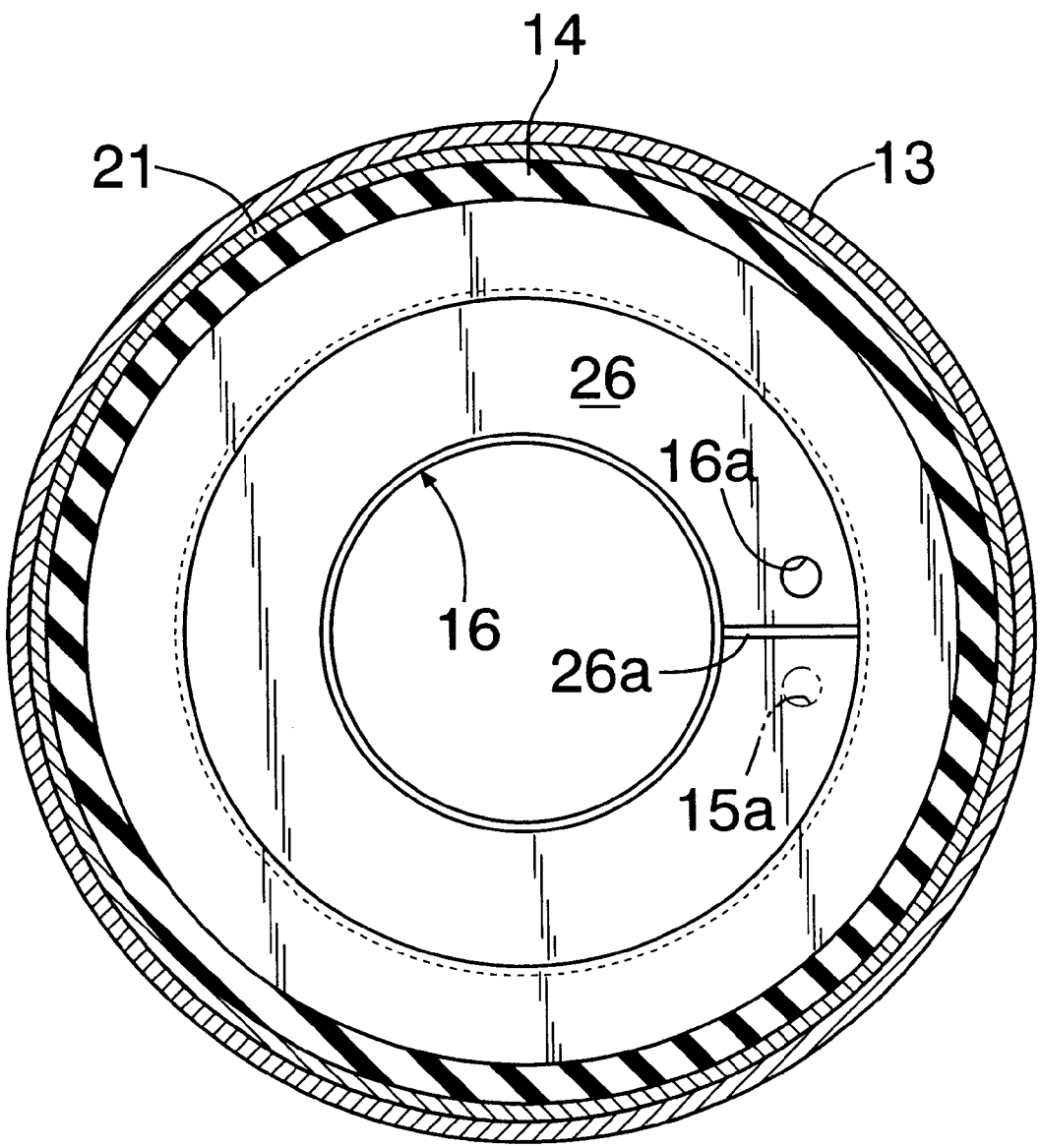

The upper orifice 26 is an annular passage formed between the first orifice-forming member 15 and the second orifice-forming member 16. A through hole 15a is formed in the first orifice-forming member 15 on one side of a partition 26a provided in a part of the upper orifice 26, and a through hole 16a is formed in the second orifice-forming member 16 on the other side of the partition 26a. The upper orifice 26 is therefore formed along an almost complete circumference from the through hole 15a of the first orifice-forming member 15 to the through hole 16a of the second orifice-forming member 16 (FIG. 2).

Figure 3:
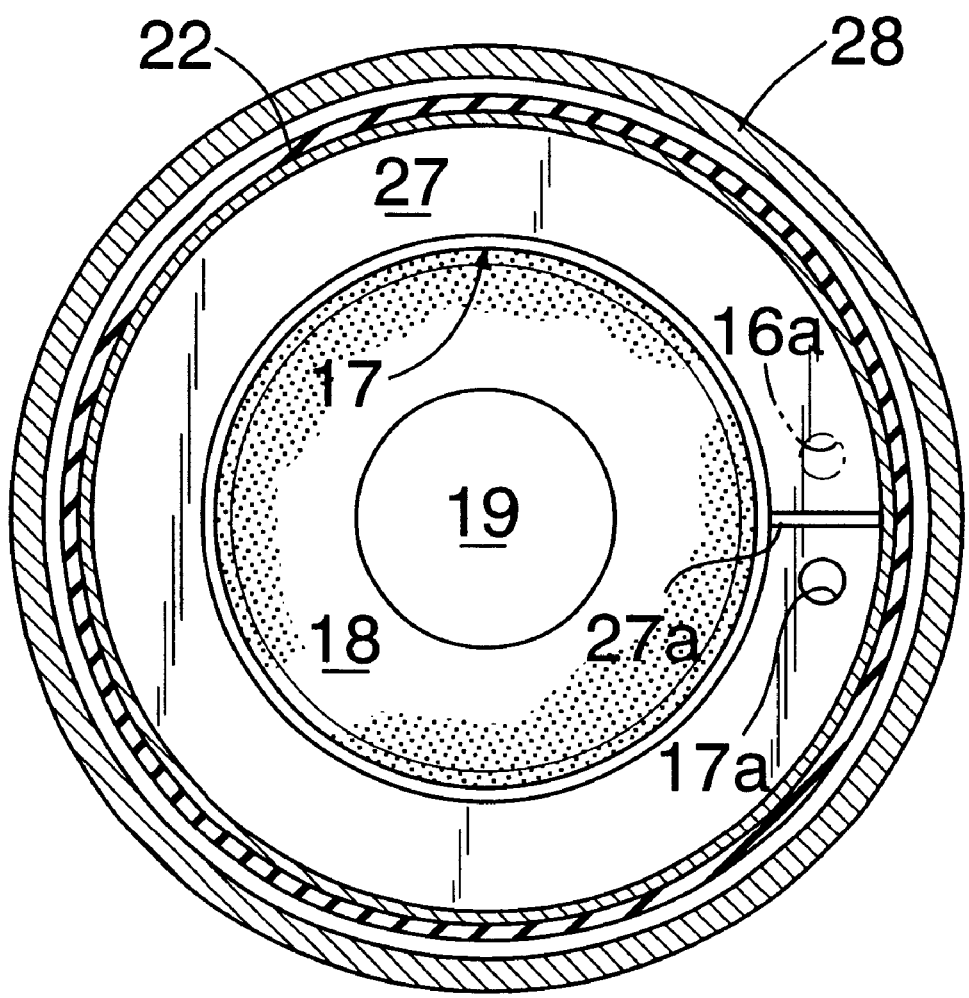
Figure 4:
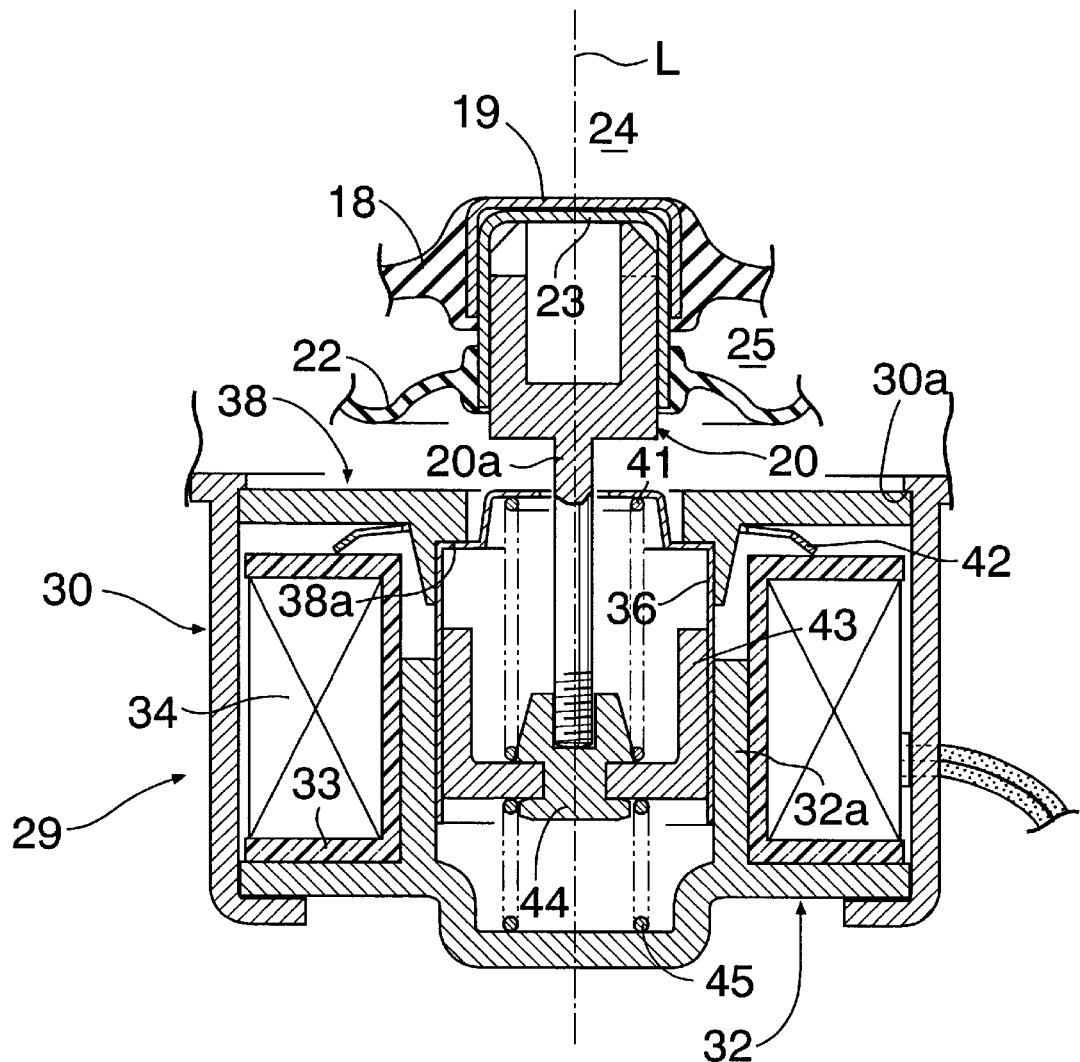

The lower orifice 27 is an annular passage formed between the second orifice-forming member 16 and the third orifice-forming member 17. The through hole 16a is formed in the second orifice-forming member 16 on one side of a partition 27a provided in a part of the lower orifice 27, and a through hole 17a is formed in the third orifice-forming member 17 on the other side of the partition 27a. The lower orifice 27 is therefore formed along an almost complete circumference from the through hole 16a of the second orifice-forming member 16 to the through hole 17a of the third orifice-forming member 17 (FIG. 3).

That is, the first liquid chamber 24 and the second liquid chamber 25 communicate with each other via the upper orifice 26 and the lower orifice 27 that are connected to each other in tandem.

Fixed to the caulking fixing part 13a of the outer tube 13 is an annular mounting bracket 28 for fixing the active vibration isolation support system M to the vehicle body frame F. Welded to the lower face of the mounting bracket 28 is an actuator housing 30 forming an outer shell of an actuator 29 for driving the movable member 20.

A yoke 32 is fixed to the actuator housing 30, and an annular coil 34 wound around a bobbin 33 is housed in a space surrounded by the actuator housing 30 and the yoke 32. A bottomed cylinder-shaped bearing 36 is fitted in a tubular part 32a of the yoke 32, the tubular part 32a being fitted in the inner periphery of the annular coil 34. A disc-shaped armature 38 that faces the upper face of the coil 34 is slidably supported on the inner periphery of the actuator housing 30, and a step 38a formed on the inner periphery of the armature 38 engages with an upper part of the bearing 36. The armature 38 is urged upward by a disc spring 42 that is disposed between the armature 38 and the bobbin 33, and is positioned by being engaged with a retaining part 30a provided on the actuator housing 30.

A cylindrical slider 43 is slidably fitted in the inner periphery of the bearing 36, and a shaft 20a extending downward from the movable member 20 runs loosely through the upper base of the bearing 36 and is connected to a boss 44 that is fixed to the interior of the slider 43. A coil spring 41 is positioned between the upper base of the bearing 36 and the slider 43, the bearing 36 being urged upward by the coil spring 41 and the slider 43 being urged downward thereby.

When the coil 34 of the actuator 29 is in a demagnetized state, the coil spring 41 applies a downward elastic force to the slider 43 slidably supported in the bearing 36, a coil spring 45 disposed between the slider 43 and the base of the yoke 32 applies an upward elastic force thereto, so that the slider 43 comes to rest at a position where the elastic forces of the two coil springs 41 and 45 are in balance. When the coil 34 is excited in this state so as to draw the armature 38 downward, the step 38a pushes the bearing 36 to slide it downward thus compressing the coil spring 41. As a result, the elastic force of the coil spring 41 increases thus lowering the slider 43 while compressing the coil spring 45, the movable member 20 that is connected to the slider 43 via the boss 44 and the shaft 20a therefore descends, and the second elastic body 18 that is connected to the movable member 20 deforms downward thus increasing the capacity of the first liquid chamber 24. Conversely, when the coil 34 is demagnetized, the movable member 20 rises, the second elastic body 18 deforms upward, and the capacity of the first liquid chamber 24 decreases.

When a low frequency engine shake vibration occurs while the automobile is traveling, and a load input from the engine E deforms the first elastic body 14 thus changing the capacity of the first liquid chamber 24, the liquid travels to and fro between the first liquid chamber 24 and the second liquid chamber 25, which are connected to each other via the upper orifice 26 and the lower orifice 27. When the capacity of the first liquid chamber 24 increases and decreases, the capacity of the second liquid chamber 25 decreases and increases accordingly, and this change in the capacity of the second liquid chamber 25 is absorbed by elastic deformation of the diaphragm 22. Since the shapes and dimensions of the upper orifice 26 and the lower orifice 27 and the spring constant of the first elastic body 14 are set so that a low spring constant and a high attenuation force can be obtained in a region of the frequency of engine shake vibration, the vibration that is transmitted from the engine E to the vehicle body frame F can be reduced effectively.

In this frequency region of the engine shake vibration, the actuator 29 is maintained in a non-operational state.

If vibration occurs having a frequency that is higher than that of this engine shake vibration, that is, if idling vibration or muffled sound vibration due to rotation of the crankshaft of the engine E occurs, since the liquid within the upper orifice 26 and the lower orifice 27 that provide communication between the first liquid chamber 24 and the second liquid chamber 25 becomes stationary and cannot exhibit the vibration isolation function, the actuator 29 is operated so as to exhibit the vibration isolation function.

In order for the vibration isolation function of the actuator 29 to be exhibited, the electronic control unit U controls the application of current to the coil 34 based on the signal from the crank pulse sensor S. The details of this control are now specifically explained by reference to the flow chart of FIG. 5.

Firstly, in step S1, crank pulses that are output from the crank pulse sensor S for every 10° of crank angle are captured, and comparing in step S2 the crank pulses so captured with a reference crank pulse (the TDC signal of a specified cylinder) gives the time intervals between the crank pulses. In the subsequent step S3, dividing the 10° crank angle by the time interval between crank pulses gives a crank angular speed $\omega$, and in step S4 the crank angular speed $\omega$ is differentiated with respect to time to give a crank angular acceleration $d\omega/dt$. In the subsequent step S5, a torque Tq around the crankshaft of the engine E is obtained from $$Tq = I \times d\omega/dt$$

where I denotes the moment of inertia around the crankshaft of the engine E. If it is assumed that the crankshaft rotates at a constant angular speed $\omega$ this torque Tq is 0; however, acceleration of the piston increases the angular speed $\omega$ during the expansion stroke, and deceleration of the piston decreases the angular speed $\omega$ during the compression stroke, thus generating a crank angular acceleration $d\omega/dt$, so that the torque Tq is generated in proportion to the crank angular acceleration $d\omega/dt$.

In the subsequent step S6, the maximum torque value and the minimum torque value that are adjacent in time are determined. In step S7, the difference between the maximum value and the minimum value for the torque, that is, the amount of change in torque, is calculated to give the amplitude at the position of the active vibration isolation support device M supporting the engine E. This amplitude corresponds to the engine vibration magnitude of the present invention. In the subsequent step S8, if the amplitude is equal to or greater than a preset value, the engine vibration phase is calculated in step S9. The engine vibration phase can be calculated from the crank angle at which the torque is a maximum. On the other hand, if in step S8 the amplitude is less than the preset value, the engine vibration phase is fixed at a preset value in step S10. In step S11, the duty waveform and the timing (phase) of the current applied to the coil 34 of the actuator 29 are determined based on the calculated engine vibration magnitude and the calculated engine vibration phase (or the preset engine vibration phase).

When the engine E undergoes a downward excursion due to the vibration and the capacity of the first liquid chamber 24 decreases, thus increasing the liquid pressure, the armature 38 is drawn in by exciting the coil 34. As a result, the armature 38 moves downward together with the slider 43 and the movable member 20 while compressing the coil springs 41 and 45, thus deforming downward the second elastic body 18 whose inner periphery is connected to the movable member 20. Consequently, the capacity of the first liquid chamber 24 increases thus suppressing the increase in liquid pressure, and the active vibration isolation support system M thus generates an active support force to prevent transmission of the downward load from the engine E to the vehicle body frame F.

Conversely, when the engine E undergoes an upward excursion due to the vibration and the capacity of the first liquid chamber 24 increases, thereby decreasing the liquid pressure, the drawing-in of the armature 38 is canceled by demagnetizing the coil 34. As a result, the armature 38 moves upward together with the slider 43 and the movable member 20 due to the elastic force of the coil springs 41 and 45, thus deforming upward the second elastic body 18 whose inner periphery is connected to the movable member 20. Consequently, the capacity of the first liquid chamber 24 decreases thus suppressing the decrease in liquid pressure, and the active vibration isolation support system M thus generates an active support force to prevent transmission of the upward load from the engine E to the vehicle body frame F.

As described above, the engine vibration magnitude and the engine vibration phase are estimated from the crank pulses of the engine E detected by the crank pulse sensor S, and the current that is applied to the coil 34 of the actuator 29 is controlled based on the estimated magnitude and engine vibration phase. Therefore, the active vibration isolation support system M can exhibit an effective vibration isolation function without being influenced by variations in the vibration characteristics among individual engines E or changes in the vibration characteristics accompanying long-term use of the engine.

Furthermore, when the estimated engine vibration is small, since the variation in torque is also small, the precision of the engine vibration phase, which is estimated using the phase at which the torque is a maximum, deteriorates, thereby making it difficult to control the actuator 29 appropriately. However, in this case, the actuator 29 is controlled based on the estimated engine vibration magnitude and the preset engine vibration phase; even when it is difficult to estimate the engine vibration phase, the actuator 29 can be controlled appropriately, and the active vibration isolation support system M can exhibit an effective vibration isolation function.

An embodiment of the present invention has been described in detail above, but the present invention can be modified in a variety of ways without departing from the spirit and scope of the invention.

For example, an active vibration isolation support system M supporting an engine E of an automobile is illustrated in the embodiment, but the active vibration isolation support system of the present invention can be applied to the support for other vibrating bodies such as a machine tool.

Furthermore, in the embodiment, when the amplitude is equal to or greater than the preset value, the current that is applied to the actuator 29 is controlled based on the calculated engine vibration magnitude and the calculated engine vibration phase, but the current that is applied to the actuator 29 may be controlled based on the calculated engine vibration phase alone. Similarly, in the embodiment, when the amplitude is less than the preset value, the current that is applied to the actuator 29 is controlled based on the calculated engine vibration magnitude and the preset engine vibration phase, but the current that is applied to the actuator 29 may be controlled based on the preset engine vibration phase alone.

As described above, in accordance with the first aspect of the present invention, the engine vibration magnitude and the engine vibration phase are estimated from crank pulses of the engine, and the actuator is controlled based on the estimated engine vibration phase when the estimated engine vibration is large. Therefore, an effective vibration isolation function can be exhibited by appropriately controlling the actuator without it being influenced by variations in the magnitude and phase of the vibration among individual engines or changes in the vibration characteristics accompanying long-term use of the engine. Furthermore, the actuator is controlled based on the preset engine vibration phase when the estimated engine vibration is small. Therefore, even when it is difficult to estimate the engine vibration phase because the engine vibration is small, an effective vibration isolation function can be exhibited by appropriately controlling the actuator.

Moreover, in accordance with the second aspect of the present invention, the engine vibration magnitude and the engine vibration phase are estimated from crank pulses of the engine, and the actuator is controlled based on the estimated engine vibration magnitude and the estimated engine vibration phase when the estimated engine vibration is large. Therefore, an effective vibration isolation function can be exhibited by appropriately controlling the actuator without it being influenced by variations in the magnitude and phase of the vibration among individual engines or changes in the vibration characteristics accompanying long-term use of the engine. Furthermore, the actuator is controlled based on the estimated engine vibration magnitude and the preset engine vibration phase when the estimated engine vibration is small. Therefore, even when it is difficult to estimate the phase of engine vibration because the engine vibration is small, an effective vibration isolation function can be exhibited by appropriately controlling the actuator.

I claim:

1. A method for controlling the drive of an actuator of an active vibration isolation support system comprising: an elastic body receiving vibration from an engine; a liquid chamber having a wall of which at least a part is formed from the elastic body; a movable member for changing the capacity of the liquid chamber; and an actuator for driving the movable member by means of an electromagnetic force, the method comprising the steps of:

estimating an engine vibration magnitude and an engine vibration phase based on detected crank pulses of the engine; and controlling the actuator based on the estimated engine vibration phase when the estimated engine vibration magnitude is equal to or greater than a predetermined value, and controlling the actuator based on a preset engine vibration phase when the estimated engine vibration magnitude is less than the predetermined value.

2. A method for controlling the drive of an actuator of an active vibration isolation support system according to claim 1, wherein said system further comprises a crank pulse sensor which detects the crank pulses of the engine.

3. A method for controlling the drive of an actuator of an active vibration isolation support system according to claim 1, wherein said step of estimating the engine vibration magnitude involves determination of engine torque from the detected crank pulses, and determination of an amplitude of the engine vibration based on the determined engine torque.

4. A method for controlling the drive of an actuator of an active vibration isolation support system according to claim 3, wherein the amplitude of the engine vibration is determined based on a difference between a maximum torque value and a minimum torque value that are adjacent in time.

5. A method for controlling the drive of an actuator of an active vibration isolation support system according to claim 1, wherein said step of estimating the engine vibration magnitude involves determination of an amplitude of the engine vibration based on a difference between a maximum torque value and a minimum torque value that are adjacent in time.

6. A method for controlling the drive of an actuator of an active vibration isolation support system comprising: an elastic body receiving vibration from an engine; a liquid chamber having a wall of which at least a part is formed from the elastic body; a movable member for changing the capacity of the liquid chamber; and an actuator for driving the movable member by means of an electromagnetic force, the method comprising the steps of:

estimating an engine vibration magnitude and an engine vibration phase based on detected crank pulses of the engine; and controlling the actuator based on the estimated engine vibration magnitude and the estimated engine vibration phase when the estimated engine vibration magnitude is equal to or greater than a predetermined value, and controlling the actuator based on the estimated engine vibration magnitude and a preset engine vibration phase when the estimated engine vibration magnitude is less than the predetermined value.

7. A method for controlling the drive of an actuator of an active vibration isolation support system according to claim 6, wherein said system further comprises a crank pulse sensor which detects the crank pulses of the engine.

8. A method for controlling the drive of an actuator of an active vibration isolation support system according to claim 6, wherein said step of estimating the engine vibration magnitude involves determination of engine torque from the detected crank pulses, and determination of an amplitude of the engine vibration based on the determined engine torque.

9. A method for controlling the drive of an actuator of an active vibration isolation support system according to claim 8, wherein the amplitude of the engine vibration is determined based on a difference between a maximum torque value and a minimum torque value that are adjacent in time.

10. A method for controlling the drive of an actuator of an active vibration isolation support system according to claim 6, wherein said step of estimating the engine vibration magnitude involves determination of an amplitude of the engine vibration based on a difference between a maximum torque value and a minimum torque value that are adjacent in time.

* * * * *